United States Patent
Fiello

(10) Patent No.: US 11,598,296 B2
(45) Date of Patent: Mar. 7, 2023

(54) THROTTLE BODY SPACER

(71) Applicant: K&N Engineering, Inc., Riverside, CA (US)

(72) Inventor: Jonathan Richard Fiello, Yucaipa, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 17/242,147

(22) Filed: Apr. 27, 2021

(65) Prior Publication Data

US 2021/0340941 A1    Nov. 4, 2021

Related U.S. Application Data

(60) Provisional application No. 63/017,114, filed on Apr. 29, 2020.

(51) Int. Cl.
*F02M 35/10* (2006.01)
*F02M 35/104* (2006.01)

(52) U.S. Cl.
CPC .... *F02M 35/10262* (2013.01); *F02M 35/104* (2013.01)

(58) Field of Classification Search
CPC ........... F02M 35/10262; F02M 35/104; F02M 7/245; F02M 35/0204; F02M 35/10; F02M 35/10032; F02D 9/08; F02B 29/06; F02B 31/04; F02B 2031/003
See application file for complete search history.

(56) References Cited

U.S. PATENT DOCUMENTS

| | | | | |
|---|---|---|---|---|
| 4,086,899 A | * | 5/1978 | Gaylord | F02M 19/00 48/189.4 |
| 4,130,099 A | * | 12/1978 | Ferguson | F02M 29/06 123/590 |
| 4,300,513 A | * | 11/1981 | Ray | F02M 19/00 261/144 |
| 6,338,335 B1 | * | 1/2002 | Patterson | F02M 29/14 123/590 |

\* cited by examiner

*Primary Examiner* — Syed O Hasan
(74) *Attorney, Agent, or Firm* — Rutan & Tucker LLP; Hani Z. Sayed

(57) ABSTRACT

An apparatus and methods are provided for a throttle body spacer that improves the performance of an internal combustion engine. The throttle body spacer comprises a body that includes an airflow opening for conducting airflow from a throttle body into an intake manifold. A spiral is disposed along a sidewall of the airflow opening and configured for swirling the airflow. The spiral comprises a helical shape disposed around a circumference of the sidewall and extends from an initial bore near a first contact surface of the body to a second contact surface. The helical shape includes a diameter that increases as the spiral extends toward the second contact surface, giving the body a sidewall taper angle that contributes to an increase in power output of the engine. A sawtooth cross-sectional shape of the spiral causes the airflow to swirl so as to improve atomization of an air-fuel mixture entering engine.

20 Claims, 4 Drawing Sheets

THROTTLE BODY SPACER

PRIORITY

This application claims the benefit of and priority to U.S. Provisional Application, entitled "Throttle Body Spacer," filed on Apr. 29, 2020 and having application Ser. No. 63/017,114, the entirety of said application being incorporated herein by reference.

FIELD

Embodiments of the present disclosure generally relate to the field of fuel systems. More specifically, embodiments of the disclosure relate to an apparatus and methods for a throttle body spacer that improves or enhances the performance of an internal combustion engine.

BACKGROUND

Fuel injected internal combustion engines generally include a throttle body that controls the amount of airflow into an intake of the engine. The throttle body typically is disposed between an air filter box and an intake manifold, and it is usually coupled with a mass airflow sensor that measures the airflow through a throat of the throttle body. Similar to a carburetor, the throttle body includes a butterfly valve that regulates the airflow through an airflow opening or aperture. The butterfly valve may be in mechanical or electrical communication with an accelerator pedal operated by a driver. Under the operation of the accelerator pedal, the butterfly valve may be rotated within the airflow opening between a first extremal position wherein the valve obstructs a large portion of the airflow into the intake and a second extremal position wherein the butterfly valve offers very little resistance to incoming air, thereby allowing a maximal airflow into the intake.

Often, the mass airflow sensor is configured to measure the airflow and communicate it to the engine control unit (ECU), which then regulates fuel injected into the engine to obtain a required air-fuel ratio. A throttle position sensor (TPS) may be coupled with the butterfly valve to provide the ECU with information on whether the throttle is in the first extremal position (i.e., an idle position), the second extremal position (i.e., a wide-open throttle position), or somewhere in between these extremes.

Positioning a throttle body spacer between the throttle body and the intake manifold is known to affect engine performance. In some instances, a throttle body spacer may be used to increase the distance between the throttle body and the intake manifold so as to allow an increase in velocity of incoming airflow before entering the combustion chambers of the engine. The increased velocity of incoming airflow is known to improve atomization of the fuel, which improves the efficiency of internal combustion within the engine. As such, there is a continuous desire to develop throttle body spacers that are capable of decreasing fuel consumption and exhaust emissions and increasing horsepower and torque.

SUMMARY

An apparatus and methods are provided for a throttle body spacer that improves the performance of an internal combustion engine. The throttle body spacer comprises a body that includes an airflow opening for conducting airflow from a throttle body into an intake manifold. A spiral is disposed along a sidewall of the airflow opening and configured for swirling the airflow. The spiral comprises a helical shape disposed around a circumference of the sidewall and extends from an initial bore near a first contact surface of the body to a second contact surface. The helical shape includes a diameter that increases as the spiral extends toward the second contact surface, giving the body a sidewall taper angle that contributes to an increase in power output of the engine. A sawtooth cross-sectional shape of the spiral causes the airflow to swirl so as to improve atomization of an air-fuel mixture entering engine.

In an exemplary embodiment, a throttle body spacer for an internal combustion engine comprises: a body for being disposed between a throttle body and an intake manifold; an airflow opening for conducting airflow from the throttle body into the intake manifold; a spiral along a sidewall of the airflow opening for swirling the airflow; and a tapered sidewall for increasing an air charge within the intake manifold.

In another exemplary embodiment, a first contact surface comprising the body is a substantially flat surface configured to join with the throttle body. In another exemplary embodiment, the first contact surface further includes a groove configured to receive a suitable ring gasket whereby an airtight seal may be established between the throttle body spacer and the throttle body. In another exemplary embodiment, a second contact surface comprising the body is a substantially flat surface configured to join with the intake manifold. In another exemplary embodiment, the second contact surface incudes a groove configured to receive a ring gasket suitable for sealing the throttle body spacer and the intake manifold.

In another exemplary embodiment, the spiral is configured to improve atomization of an air-fuel mixture entering combustion chambers of the internal combustion engine. In another exemplary embodiment, the spiral comprises a helical shape disposed around a circumference of the sidewall of the airflow opening and extends from an initial bore near a first contact surface of the body to a second contact surface. In another exemplary embodiment, the tapered sidewall comprises a diameter of the spiral that increases as the spiral extends toward the second contact surface and gives the body a sidewall taper angle that contributes to a relative increase in power output of the internal combustion engine. In another exemplary embodiment, the tapered sidewall includes a sidewall taper angle ranging between about 5-degrees and about 15-degrees.

In another exemplary embodiment, the spiral includes a sawtooth cross-sectional shape that is biased toward a first contact surface of the body. In another exemplary embodiment, the sawtooth cross-sectional shape is configured to interact with incoming air and cause the airflow to swirl. In another exemplary embodiment, the spiral includes a top surface that is generally perpendicular to the airflow opening and an angled surface that is disposed at a spiral angle with respect to the top surface. In another exemplary embodiment, spiral includes a spiral depth and a spiral pitch comprising the spiral angle. In another exemplary embodiment, the spiral depth and the spiral pitch are configured to provide a spiral angle of substantially 45 degrees.

In an exemplary embodiment, a method for a throttle body spacer for an internal combustion engine comprises: configuring a body for being disposed between a throttle body and an intake manifold; forming an airflow opening in the body for conducting airflow from the throttle body into the intake manifold; disposing a spiral along a sidewall of the airflow opening for swirling the airflow; and tapering the sidewall for increasing an air charge within the intake manifold.

In another exemplary embodiment, disposing the spiral includes disposing a helical shape around a circumference of the sidewall of the airflow opening such that the spiral extends from an initial bore near a first contact surface of the body to a second contact surface of the body. In another exemplary embodiment, tapering the sidewall includes increasing a diameter of the spiral as the spiral extends toward the second contact surface and gives the body a sidewall taper angle that contributes to a relative increase in power output of the internal combustion engine.

In another exemplary embodiment, disposing the spiral includes forming a sawtooth cross-sectional shape that is biased toward a first contact surface of the body. In another exemplary embodiment, forming the sawtooth cross-sectional shape includes forming a top surface of the spiral that is generally perpendicular to the airflow opening; and wherein forming the sawtooth cross-sectional shape includes forming an angled surface that is disposed at a spiral angle with respect to the top surface. In another exemplary embodiment, forming the angled surface includes configuring a spiral depth and a spiral pitch comprising the spiral angle.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
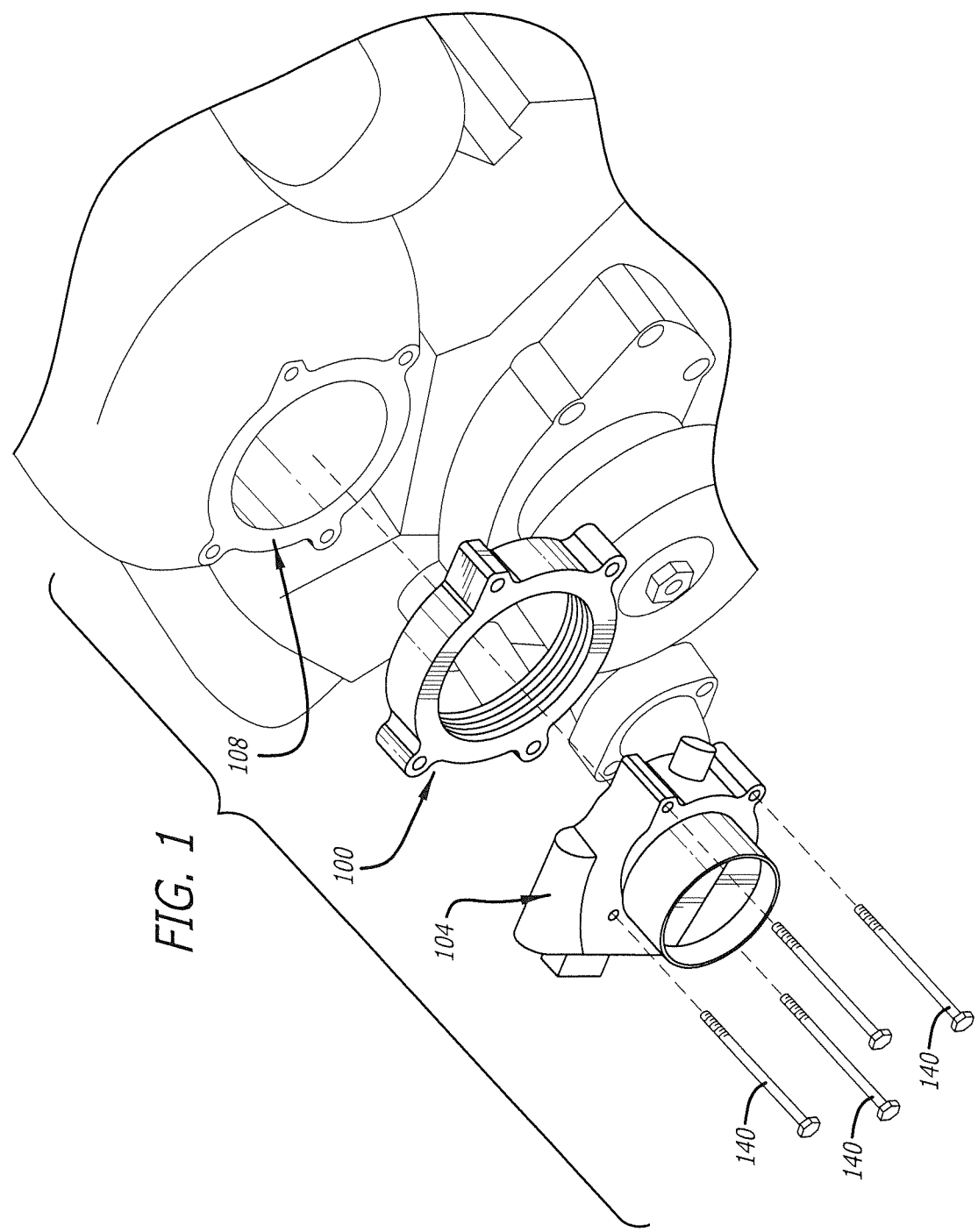
FIG. 1 illustrates an exploded view of an exemplary embodiment of a throttle body spacer disposed between a throttle body and an intake manifold of an internal combustion engine.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first surface," may be made. However, the specific numeric reference should not be interpreted as a literal sequential order but rather interpreted that the "first surface" is different than a "second surface." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Fuel injected internal combustion engines generally include a throttle body that controls the amount of airflow into an intake of the engine. The throttle body typically is disposed between an air filter box and an intake manifold, and it is usually coupled with a mass airflow sensor that measures the airflow entering through an airflow opening of the throttle body. A throttle body spacer may be positioned between the throttle body and the intake manifold to affect the performance of the engine. As such, there is a continuous desire to develop throttle body spacers that can decrease fuel consumption, decrease exhaust emissions, increase horsepower, or increase torque. Embodiments presented herein provide throttle body spacers that improve or enhance engine performance.

FIG. 1 illustrates a perspective view of an exemplary embodiment of a throttle body spacer 100 disposed between a throttle body 104 and an intake manifold 108 of an internal combustion engine. The throttle body 104 and intake manifold 108 are purely exemplary in nature and should be understood to be typical of those conventional components found on a wide variety of internal combustion engines, particularly automobiles and trucks that include electronic fuel injection systems. The throttle body spacer 100 essentially is a standalone component that is simple to install and configured to increase the power output of the engine. Preferably, the throttle body spacer 100 is comprised of billet 6061 aluminum or other suitable rigid material.

Figure 2:
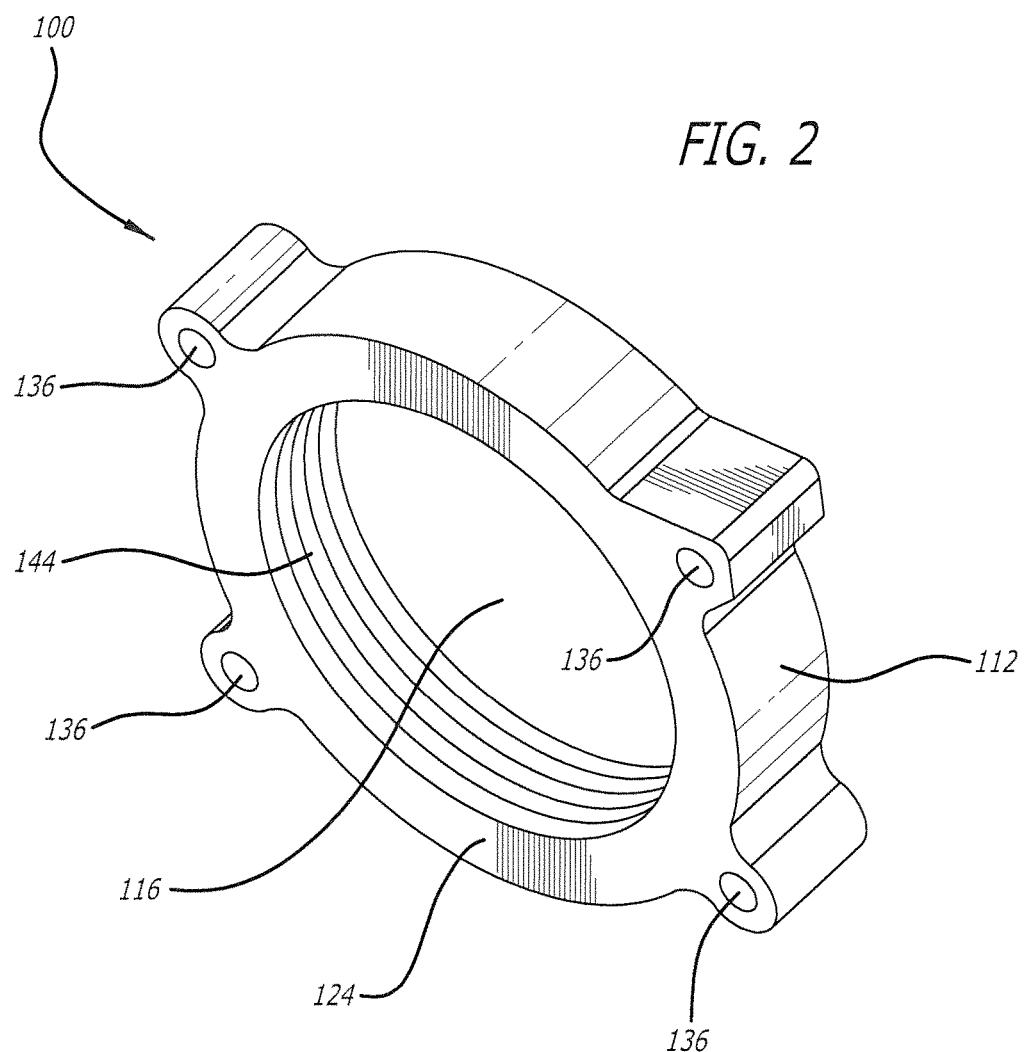
FIG. 2 illustrates an isometric view of an exemplary embodiment of a throttle body spacer that includes an airflow opening having a spiral.

FIG. 2 illustrates an isometric view of an exemplary embodiment of the throttle body spacer 100. The throttle body spacer 100 generally includes a body 112 and a centrally disposed airflow opening 116. In the illustrated embodiment of FIG. 2, the airflow opening 116 comprises a single aperture. In some embodiments, however, the airflow opening 116 may include more than one aperture, such as, for example, two apertures, three apertures, four apertures, or a multiplicity of apertures comprising a lattice structure, without limitation.

Figure 4:
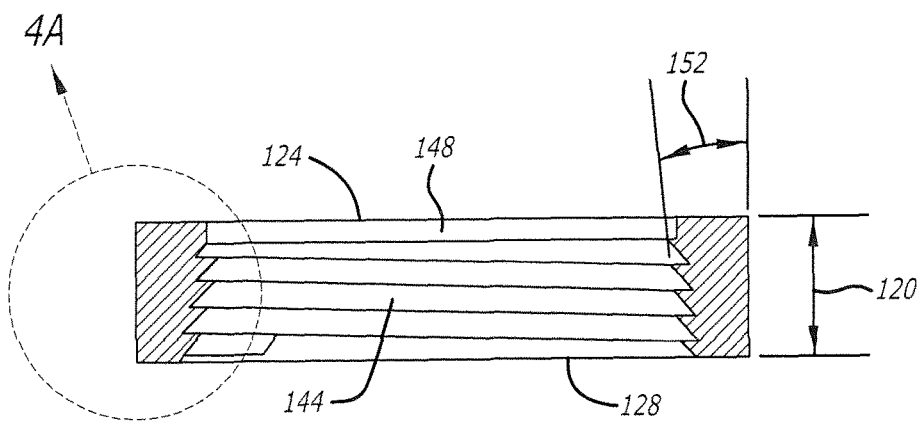
FIG. 4 illustrates a cross-sectional view of the throttle body spacer of FIG. 3, taken along line 4-4.
Figure 5:
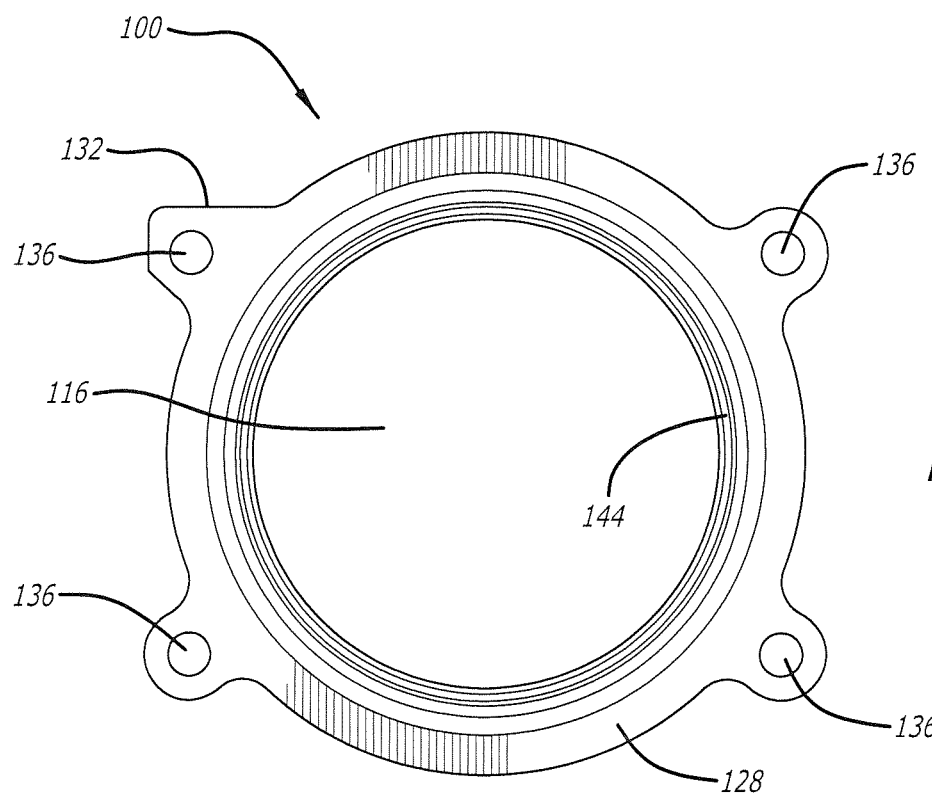
FIG. 5 illustrates a bottom plan view of the throttle body spacer of FIG. 2.

In the embodiment of FIG. 2, the body 112 is a generally cylindrical member having a uniform thickness 120 (see FIG. 4) that extends from a first contact surface 124 to a second contact surface 128 shown in FIG. 5. The thickness 120 is configured to increase the distance between the throttle body 104 and the intake manifold 108, as shown in FIG. 1. It is contemplated that the thickness 120 may range between about 0.5 inches and greater than about 1.0 inches. In some embodiments, however, the thickness of the throttle body spacer 100 may be variable or otherwise altered from that shown in FIG. 2, without limitation, depending on the specific application of the throttle body 104 and intake manifold 108 for which the throttle body spacer 100 is to be used.

The first contact surface 124 is a generally flat surface configured to enable joining the throttle body 104 and throttle body spacer 100. As will be appreciated, a suitable gasket may be disposed between the throttle body spacer 100 and the throttle body 104 to ensure an airtight seal is formed therebetween. It is contemplated that the first contact surface 124 may be adapted to receive any of various gaskets suitable for sealing the throttle body spacer 100 and the throttle body 104. For example, in some embodiments the first contact surface 124 may further include a groove configured to receive a suitable ring gasket, such as an O-ring gasket, whereby the airtight seal may be established between the throttle body spacer 100 and the throttle body 104.

The second contact surface 128, shown in FIG. 5, is similar to the first contact surface 124, with the exception that the second contact surface 128 is configured to enable joining the throttle body spacer 100 to the intake manifold 108. The second contact surface 128 is a generally flat surface adapted to receive a suitable gasket for forming an airtight seal between the throttle body spacer 100 and the intake manifold 108. As mentioned in connection with the first contact surface 124, the second contact surface 128 may be configured to receive any of various gaskets suitable for forming the airtight seal between the throttle body spacer 100 and the intake manifold 108. In some embodiments, for example, a groove may be disposed in the second contact surface 128 and configured to receive a ring gasket, such as an O-ring gasket configured to seal the throttle body spacer 100 and the intake manifold 108.

Figure 3:
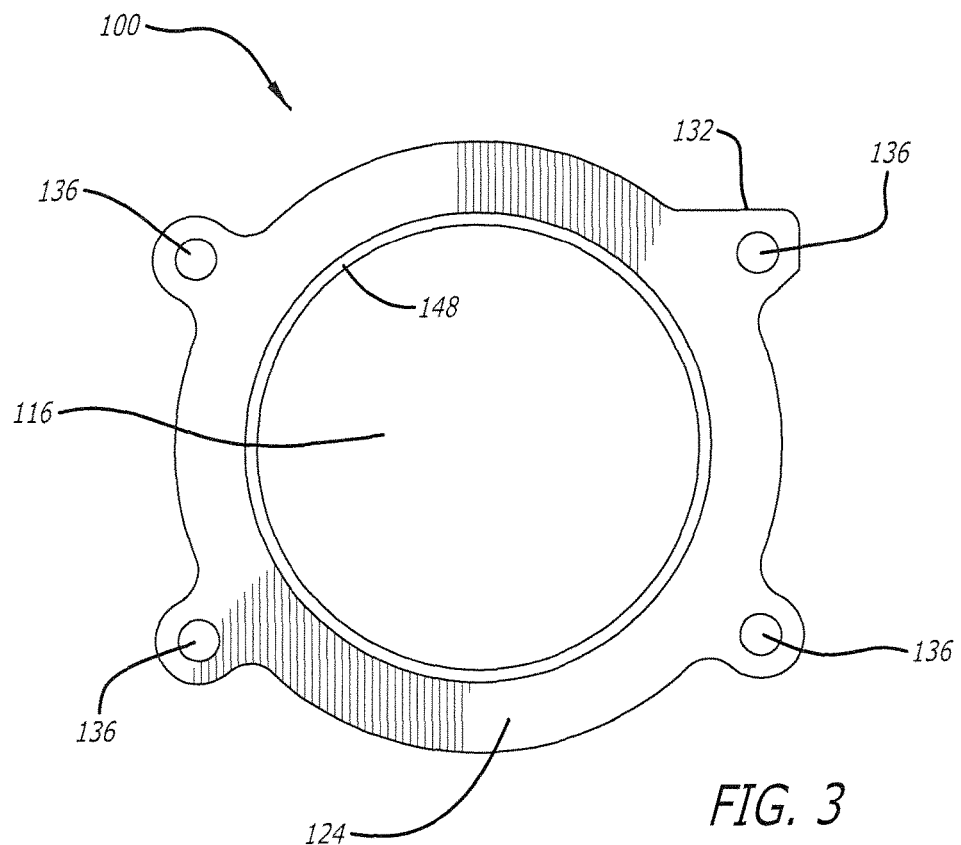
FIG. 3 illustrates a top plan view of the throttle body spacer of FIG. 2.

As best shown in FIGS. 3 and 5, the body 112 includes a perimeter 132 that has a shape configured to match the contact surface of the throttle body 104 and the intake manifold 108. Multiple through-holes 136 are disposed in locations of the perimeter 132 that align with bolt-holes disposed in the throttle body 104 and the intake manifold 108. As will be appreciated, the through-holes 136 are configured to receive bolts 140 (see FIG. 1) that may be extended through the bolt-holes in the throttle body 104 and threaded into holes in the intake manifold 108 so as to fasten the throttle body spacer 100 between the throttle body 104 and the intake manifold 108 as shown in FIG. 1. The shape of the perimeter 132 ensures that the throttle body spacer 100 advantageously seats between the throttle body 104 and the intake manifold 108 without being obstructed by nearby components. It should be understood that the shape of the perimeter 132, as well the size, locations and number of the through-holes 136, may be altered to accommodate various applications of the specific throttle body 104 and intake manifold 108 for which the throttle body spacer 100 is to be used, without limitation.

Turning again to FIG. 2, the airflow opening 116 includes a spiral 144 disposed along a sidewall of the airflow opening 116 and configured to cause air entering the throttle body spacer 100 to rotate or swirl so as to reduce turbulence. Experimentation has demonstrated that using the spiral 144 to swirl the airflow improves atomization of the air-fuel mixture before entering the combustion chambers of the engine. The spiral 144 comprises a generally helical shape disposed around the circumference of the sidewall of the airflow opening 116. As shown in FIG. 4, the spiral 144 extends from an initial bore 148 near the first contact surface 124 to the second contact surface 128. Further, the diameter of the airflow opening 116 increases as the spiral 144 extends toward the second contact surface 128, giving the body 112 a sidewall taper angle 152 that contributes to a greater air charge within the intake manifold 108. As will be appreciated, increasing the air charge within the intake manifold 108 gives rise to a relative increase in power output of the engine, particularly at lower throttle positions wherein the butterfly valve obstructs a large portion of the airflow into the intake manifold 108. In some embodiments, the sidewall taper angle 152 may range between about 5-degrees and about 15-degrees, without limitation. In some embodiments, the sidewall taper angle 152 may be substantially 10-degrees.

Figure 4A:
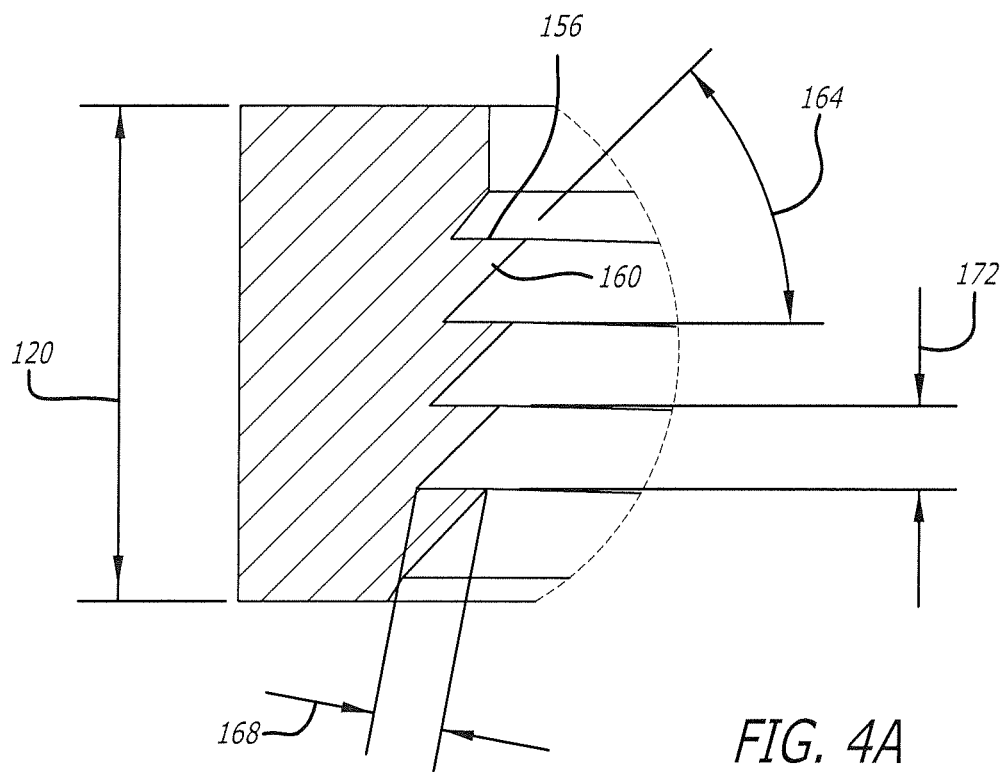
FIG. 4A illustrates a close-up detail view of a portion of the throttle body spacer of FIG. 4.

As shown in FIG. 4, the spiral 144 includes a sawtooth cross-sectional shape that is biased toward the first contact surface 124. The sawtooth cross-sectional shape is configured to interact with incoming air and cause the airflow to swirl, as described herein. As best shown in FIG. 4A, the spiral 144 includes a top surface 156 that is generally perpendicular to the airflow opening 116. Below the top surface 156 is an angled surface 160 that is disposed at a spiral angle 164 with respect to the top surface 156. As will be appreciated, the spiral angle 164 will depend on a spiral depth 168 and a spiral pitch 172 characterizing the spiral 144. For example, in some embodiments, the spiral depth 168 and spiral pitch 172 may be configured to provide a spiral angle 164 of substantially 45-degrees. It is to be borne in mind, however, that any one or more of the sidewall taper angle 152, the top surface 156, the angled surface 160, the spiral angle 164, the spiral depth 168, and the spiral pitch 172 may be varied as is found to advantageously affect engine performance, without limitation, and without deviating beyond the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A throttle body spacer for an internal combustion engine, the throttle body spacer comprising:
 a body for being disposed between a throttle body and an intake manifold;
 the body having at least a first contact surface and a second contact surface;
 an initial bore near the first contact surface;
 an airflow opening for conducting airflow from the throttle body into the intake manifold;
 a spiral disposed along a sidewall of the airflow opening for swirling the airflow and configured to cause air entering the throttle body space to rotate or swirl to reduce turbulence wherein the spiral extends from the initial bore to the second contact surface; and
 a diameter of the airflow opening increases as the spiral extends toward the second contact surface;
 a tapered sidewall of the body at an angle that contributes to a greater air charge within the intake manifold.

2. The throttle body spacer of claim 1, wherein the first contact surface comprising the body is a substantially flat surface configured to join with the throttle body.

3. The throttle body spacer of claim 2, wherein the first contact surface further includes a groove configured to receive a suitable ring gasket whereby an airtight seal may be established between the throttle body spacer and the throttle body.

4. The throttle body spacer of claim 1, wherein a second contact surface comprising the body is a substantially flat surface configured to join with the intake manifold.

5. The throttle body spacer of claim 4, wherein the second contact surface incudes a groove configured to receive a ring gasket suitable for sealing the throttle body spacer and the intake manifold.

6. The throttle body spacer of claim 1, wherein the spiral is configured to improve atomization of an air-fuel mixture entering combustion chambers of the internal combustion engine.

7. The throttle body spacer of claim 6, wherein the spiral comprises a helical shape disposed around a circumference of the sidewall of the airflow opening and extends from an initial bore near a first contact surface of the body to a second contact surface.

8. The throttle body spacer of claim 7, wherein the tapered sidewall comprises a diameter of the spiral that increases as the spiral extends toward the second contact surface and gives the body a sidewall taper angle that contributes to an increase in power output of the internal combustion engine.

9. The throttle body spacer of claim 8, wherein the tapered sidewall includes a sidewall taper angle ranging between about 5-degrees and about 15-degrees.

10. The throttle body spacer of claim 1, wherein the spiral includes a sawtooth cross-sectional shape that is biased toward a first contact surface of the body.

11. The throttle body spacer of claim 10, wherein the sawtooth cross-sectional shape is configured to interact with incoming air and cause the airflow to swirl.

12. The throttle body spacer of claim 10, wherein the spiral includes a top surface that is generally perpendicular to the airflow opening and an angled surface that is disposed at a spiral angle with respect to the top surface.

13. The throttle body spacer of claim 11, wherein spiral includes a spiral depth and a spiral pitch comprising the spiral angle.

14. The throttle body spacer of claim 13, wherein the spiral depth and the spiral pitch are configured to provide a spiral angle of substantially 45 degrees.

15. A method for a throttle body spacer for an internal combustion engine, comprising:
    configuring a body for being disposed between a throttle body and an intake manifold;
    providing the body with at least a first contact surface and a second contact surface;
    providing an initial bore near the first contact surface
    forming an airflow opening in the body for conducting airflow from the throttle body into the intake manifold;
    disposing a spiral along a sidewall of the airflow opening for swirling the airflow and configuring the sidewall to cause air entering the throttle body space to rotate or swirl to reduce turbulence wherein the spiral extends from the initial bore to the second contact surface;
    providing a diameter of the airflow opening that increases as the spiral extends toward the second contact surface; and
    tapering the sidewall of the body at an angle that contributes to a greater air charge within the intake manifold.

16. The method of claim 15, wherein disposing the spiral includes disposing a helical shape around a circumference of the sidewall of the airflow opening such that the spiral extends from an initial bore near a first contact surface of the body to a second contact surface of the body.

17. The method of claim 16, wherein tapering the sidewall includes increasing a diameter of the spiral as the spiral extends toward the second contact surface and gives the body a sidewall taper angle that contributes to a relative increase in power output of the internal combustion engine.

18. The method of claim 15, wherein disposing the spiral includes forming a sawtooth cross-sectional shape that is biased toward a first contact surface of the body.

19. The method of claim 18, wherein forming the sawtooth cross-sectional shape includes forming a top surface of the spiral that is generally perpendicular to the airflow opening; and wherein forming the sawtooth cross-sectional shape includes forming an angled surface that is disposed at a spiral angle with respect to the top surface.

20. The method of claim 19, wherein forming the angled surface includes configuring a spiral depth and a spiral pitch comprising the spiral angle.

* * * * *